United States Patent
Munyard et al.

(10) Patent No.: US 6,939,016 B1
(45) Date of Patent: Sep. 6, 2005

(54) MIRROR MOUNTING ASSEMBLY FOR CONTROLLING VIBRATION OF A MIRROR

(75) Inventors: Andrew Gordon Stuart Munyard, Lehbrook (AU); Garry Gordon Leslie Fineri, MorphettVale (AU)

(73) Assignee: Schefenacker Vision Systems Australia Pty Ltd., Lonsdale (AU)

( * ) Notice: Subject to any disclaimer, the term of this patent is extended or adjusted under 35 U.S.C. 154(b) by 233 days.

(21) Appl. No.: 10/088,318

(22) PCT Filed: Sep. 15, 2000

(86) PCT No.: PCT/AU00/01100

§ 371 (c)(1),
(2), (4) Date: Mar. 14, 2002

(87) PCT Pub. No.: WO01/19645

PCT Pub. Date: Mar. 22, 2001

(30) Foreign Application Priority Data

Sep. 15, 1999 (AU) .................................... PQ2834

(51) Int. Cl.$^7$ .......................... G02B 5/08; G02B 7/182; B60R 1/06
(52) U.S. Cl. ...................... 359/874; 359/876; 359/877; 248/478; 248/480; 248/481
(58) Field of Search ................................ 359/872, 873, 359/874, 876, 877, 879, 881; 248/476, 477, 248/478, 479, 480, 481, 485

(56) References Cited

U.S. PATENT DOCUMENTS

| | | | |
|---|---|---|---|
| 3,498,579 A | * | 3/1970 | Vicary |
| 3,609,014 A | * | 9/1971 | Kurz, Jr. |
| 3,972,597 A | * | 8/1976 | Repay et al. |
| 4,449,788 A | * | 5/1984 | Suzuki |
| 4,555,166 A | * | 11/1985 | Enomoto |
| 4,678,295 A | * | 7/1987 | Fisher |
| 4,824,232 A | * | 4/1989 | Thompson |
| 5,042,932 A | * | 8/1991 | Pent |
| 5,107,374 A | * | 4/1992 | Lupo et al. |
| 5,274,505 A | * | 12/1993 | Nagayama et al. |
| 5,436,769 A | * | 7/1995 | Gilbert et al. |
| 5,481,931 A | * | 1/1996 | Vecchiarino |
| 5,610,772 A | | 3/1997 | Iizuka |
| 5,701,211 A | * | 12/1997 | Perry et al. |
| 5,949,591 A | | 9/1999 | Whitehead |
| 6,024,459 A | | 2/2000 | Lewis |

FOREIGN PATENT DOCUMENTS

| | | |
|---|---|---|
| DE | 3524255 A | 1/1987 |
| DE | 3923706 A | 1/1991 |

* cited by examiner

*Primary Examiner*—Ricky D. Shafer
(74) *Attorney, Agent, or Firm*—Warn, Hoffmann, Miller & LaLone, P.C.

(57) ABSTRACT

A mirror mounting assembly including a mirror support, a base portion, a pivoting joint between the support and the base portion allowing the support to pivot with respect to the base portion, a link extending between the support and the base portion, a first end of the link being held with respect to either the support or the base portion, an aperture provided in the support or the base portion into which the second end of the link locates, a tight sliding fit between the aperture and the link, the link moving through the aperture allowing the support to be adjusted with respect to the base portion, the fit being such that unwanted movement between the support and base portion is prevented during normal use.

19 Claims, 4 Drawing Sheets

MIRROR MOUNTING ASSEMBLY FOR CONTROLLING VIBRATION OF A MIRROR

This invention relates to a mirror mounting assembly, and in particular to a mirror mounting assembly for mounting an adjustable mirror in a manner that will control undesirable vibration or movement of the mirror.

BACKGROUND OF INVENTION

It is common for rear vision mirrors, particularly those mounted externally of a vehicle to be adjustable about two orthogonal axes. This adjustment can be by remote, manual or electric means, or by directly adjusting the mirror by hand.

Rear vision mirrors normally comprise a mirror body or shell with a mirror located in the shell. A base is separately mounted within the shell and a mirror support is pivotally attached to the base. This allows movement of the mirror support and the attached mirror about the adjustment axes. The base may also be part of the mirror body or shell moulding.

One principal aim is to minimise unwanted vibration or movement of the mirror support with respect to the base portion. Vibration should be minimised regardless of the position to which the mirror support is moved. Ideally, the mirror support should be easily moved to the required position, and once in that position, it should not vibrate or move as a result of forces that would be applied to the mirror during normal use of a vehicle.

Examples of mirror support assemblies incorporating movement prevention devices is shown in U.S. Pat. No. 4,826,305 and International Patent Application No WO 99/00272. Both of the mirror mounts shown in these patent specifications use friction engagement between two surfaces. However, in order to make both arrangements work, a high degree of precision is required in both moulding and mounting of the components, and the arrangements are subject to failure over a period of time as a result of reduced friction as the engagement surfaces wear.

It is an aim of this invention to provide an improved mirror mounting assembly which prevents undesirable vibration and movement of the mirror.

BRIEF DESCRIPTION OF THE INVENTION

In its broadest form, the invention is a mirror mounting assembly for preventing unwanted movement of said mirror comprising a mirror support for holding a mirror, a base portion, a pivoting joint between said mirror support and said base portion that allows said mirror support to pivot with respect to said base portion, a link extending between said mirror support and said base, a first end of said link held with respect to either said mirror support or said base portion, and an aperture in either said mirror support or said base into which the second end of said link locates, there being a tight sliding fit between said aperture and said link which allows said link to move through said aperture so that said mirror support may be adjusted with respect to said base, but which acts to prevent unwanted movement of said mirror support during normal use.

Preferably, the mirror will be fixed in a conventional manner to a mirror support. Both the mirror support and base portion are preferably moulded from polymeric materials. However, other materials such as diecast metals may be equally suited.

Preferably the base portion is a separately moulded component which itself is then located in and fixed to the moulded shell of a wing rear vision mirror. Alternatively, the base may be integrally formed with other components such as the moulded shell.

Preferably, the pivoting joint allows movement of the mirror support about two orthogonal axes. However, the invention will be equally suited to mono axis mirrors where the mirror support may be adjusted about one axis only such as a vertical axis.

The pivoting joint may comprise a variety of mounts such as a ball and socket joint, or a flexible extension between the mirror support and base portion or a universal joint.

A link and the aperture into which the link locates is provided to restrain the undesirable movement, such as vibration, of the mirror support. The link extends between the mirror support and the base portion with one end of the link held with respect to either the mirror support or base portion. The other end of the link locates within an aperture on the respective component. The fit between the link and the aperture is tight but the link is able to slide with in the aperture upon sufficient force being applied. This enables both movement of the mirror support as required and sufficient holding force to prevent undesirable movement.

The aperture may be shaped to match the cross-sectional shape of the link. The link may have a variety of cross-sectional shapes but preferably comprises either a circular cross-section or a rectangular cross-section. The aperture is matched accordingly, and the fit between the link and aperture provides the required resistance to movement so that the mirror support will not move when subject to normal road use forces. However, normal adjustment force will overcome the frictional holding force.

The aperture may also be formed between a pair of elements where one or both of the elements is moveable and has a spring force applied thereto. The link may be a flat elongate member which locates between the two elements so that a pincer force is applied to the link. The spring rate can be adjusted to provide adequate holding force while at the same time allowing movement of the link when adjustment of the mirror plate is required. The pair of elements may comprise a pair of walls where one of the walls is hinged.

Preferably, the link is pivotally attached to a first end to either the mirror support or base portion. This may comprise a ball at the end of the link which locates within a socket. The socket may be sufficiently resilient to enable the ball to be pushed into place and thereby held. Alternatively, the first end of the link may also frictionally engage an aperture in the same manner with the second end of the link. In this case, each end of the link has an enlarged end to prevent disengagement from the apertures.

In this specification, the meaning of 'held' is meant to include the link remaining stationary with respect to either mirror support or base and moving with respect to the other.

The amount of force used to hold the link will be a balance between maximising the holding force to prevent unwanted movement while not exceeding the maximum force available or desired to be used to move the mirror support.

In most instances, the mirror support is adjusted about a generally horizontal and vertical axes. A link and aperture combination for each axis of movement is used. However, it will be possible to position a single link and aperture arrangement with a dual axis movement mirror to provide the required holding force for both axes of adjustment.

In order to fully understand the invention, preferred embodiments will be described, however it should be realised that the scope of the invention is not to be limited or confined to the features of these embodiments.

BRIEF DESCRIPTION OF THE DRAWINGS

These embodiments are illustrated in accompanying drawings in which.

DETAILED DESCRIPTION

Figure 1:
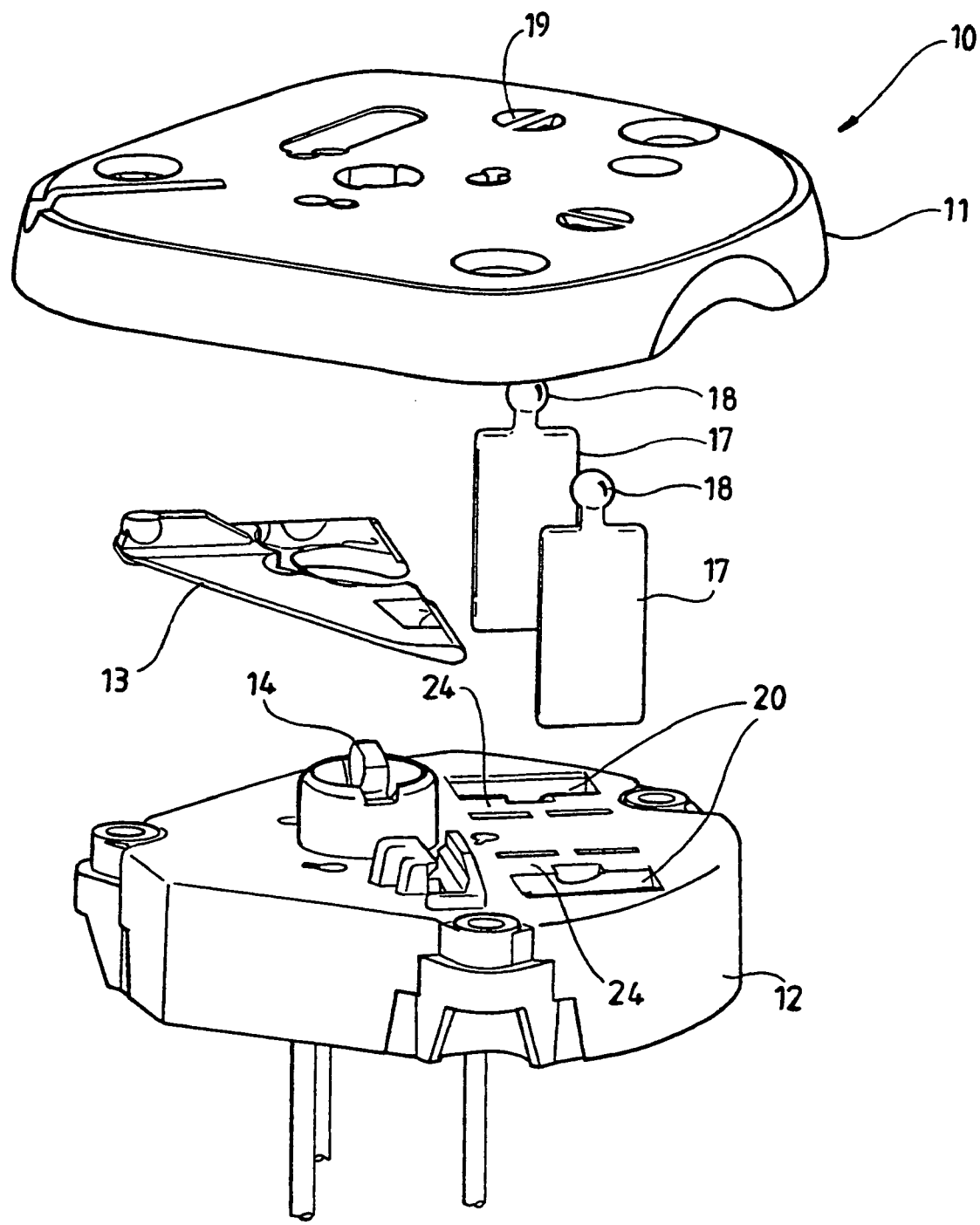
FIG. 1 shows an "exploded" view of a mirror mounting assembly.
Figure 2:
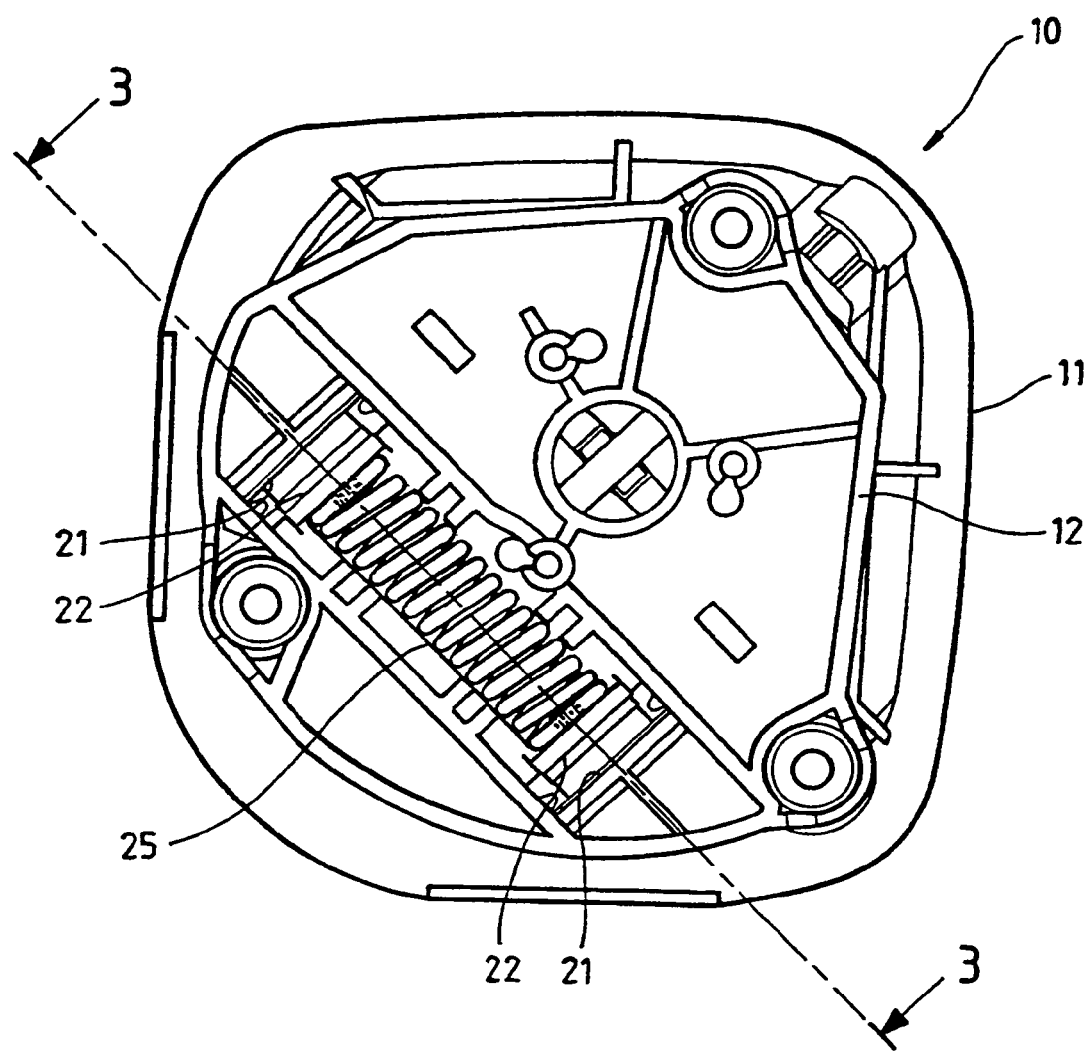
FIG. 2 shows a bottom plan view of the mirror mounting assembly.
Figure 3:
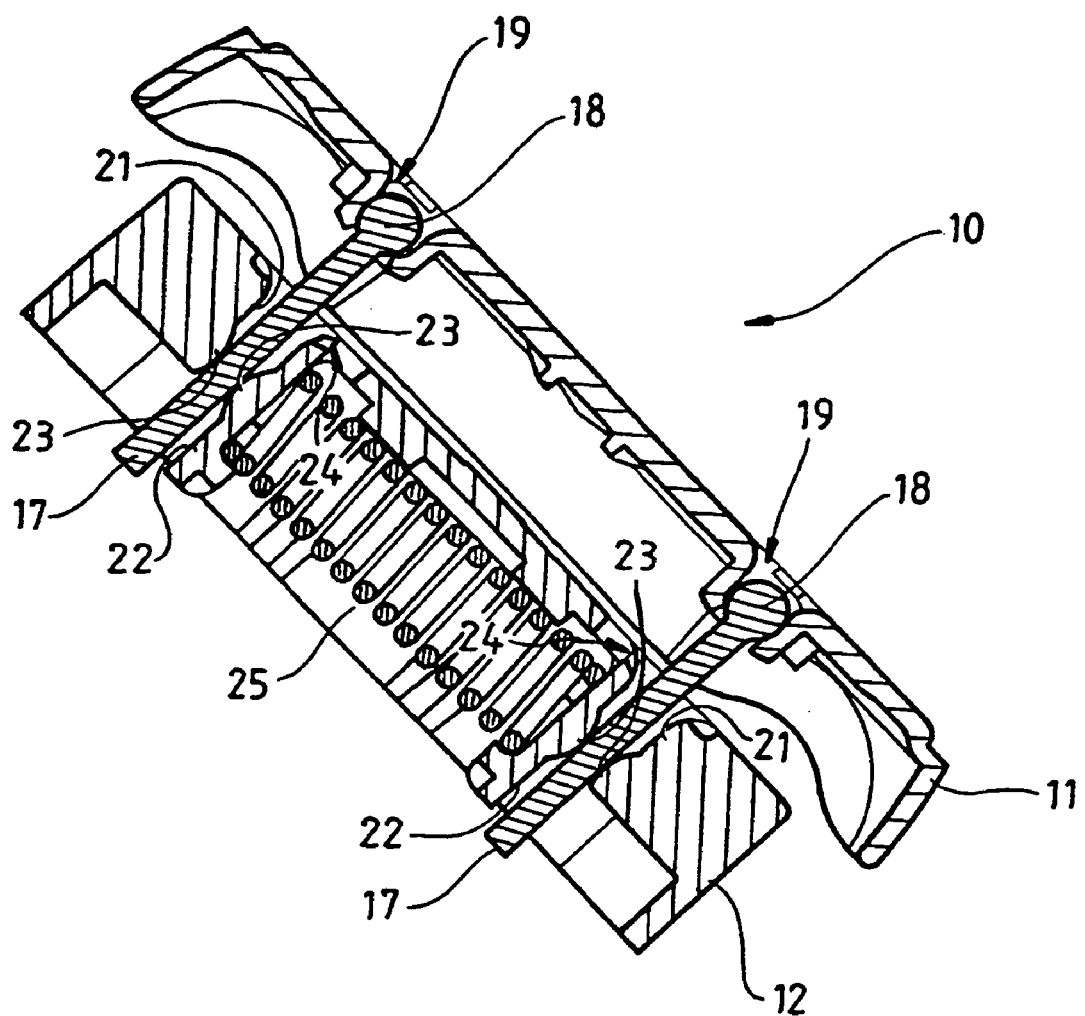
FIG. 3 shows a cross-sectional view of the mirror mounting assembly about section line 3—3 shown in FIG. 2.

FIGS. 1 to 3 show a first embodiment of the invention. The mirror mounting assembly 10 comprises a mirror support 11 and a base portion 12. The pivoting joint between the mirror support 11 and base portion 12 comprises a yoke 13 and spigot 14. The spigot 14 connects directly to the mirror support 11, and the yoke 13 is pivotally attached to the mirror support 11 and base portion 12 respectively. The yoke 13 prevents rotation of the mirror support 11 with respect to the base portion 12. This connection arrangement allows movement of the mirror support 11 with respect to the base portion 12 about two orthogonal axes.

The mirror support 11 is designed to have a mirror backing plate attached to it. The mirror backing plate holds the mirror. The base portion 12 is designed to be fixed to mirror body housing such as the shell of a wing mirror. The mirror mounting assembly 10 shown in this embodiment is designed to be manually adjusted.

In this embodiment, the links that extend between the mirror support 11 and base portion 12 comprise blades 17. Each of the blades 17 is of rectangular cross-section with a retaining ball 18 formed at one end. Each retaining ball 18 locates within a socket 19 on the mirror support 11. The blades 17 are retained on the mirror support 11 and able to pivot with respect to it.

Each of the blades 17 locates within apertures 20 in the base portion 12. The apertures 20 have a generally rectangular cross-section which is similar in dimensions to the cross-section of blades 17. The longer edges of the apertures 20 comprise a fixed wall 21 and a moveable wall 22 respectively. The fixed and moveable walls 21 and 22 each have a ridge 23 which provide the point of contact between the fixed and moveable walls 21 and 22 and the blades 17.

The movable walls 22 are integrally moulded with the base portion 12 and are connected thereto by a hinge line 24 that enables each of the moveable walls 22 to rotate about the hinge line 24. A compression spring 25 is located between the moveable walls 22 and acts to push the moveable walls 22 towards the fixed walls 21. The compression spring 25 applies the required force to the friction blades 17 via the moveable walls 22 when they are located within the apertures 20.

Preferably, the base portion 12 and the blades 17 are moulded from different polymeric materials. This prevents binding between the components which would occur if the same material were used.

In this embodiment, the blades 17 are made from a glass field polyester or nylon material. The base portion 12 is manufactured from acetal. These materials, together with the force applied by the compression spring 25, will enable the ridges 23 to have sufficient grip on the surfaces of the blades 17 to restrain unwanted movement.

In this first embodiment, a pair of blades 17 is used. Each of the blades 17 is positioned either side of the spigot 14 which provides an optimum rigidity for the mirror support 11. If the mirror support 11 is rotated about an axis passing through the spigot 14 which is parallel with the part line 3—3 shown in FIG. 2, then both of the blades 17 will move either into or out of the apertures 20. If the mirror support 11 is rotated about a second axis parallel to the first, then one blade 17 will move into its aperture 20 and the other will move out of its aperture 20. The length of the blades 17 are sufficient to cover the full range of movement of the mirror support 11.

Figure 4:
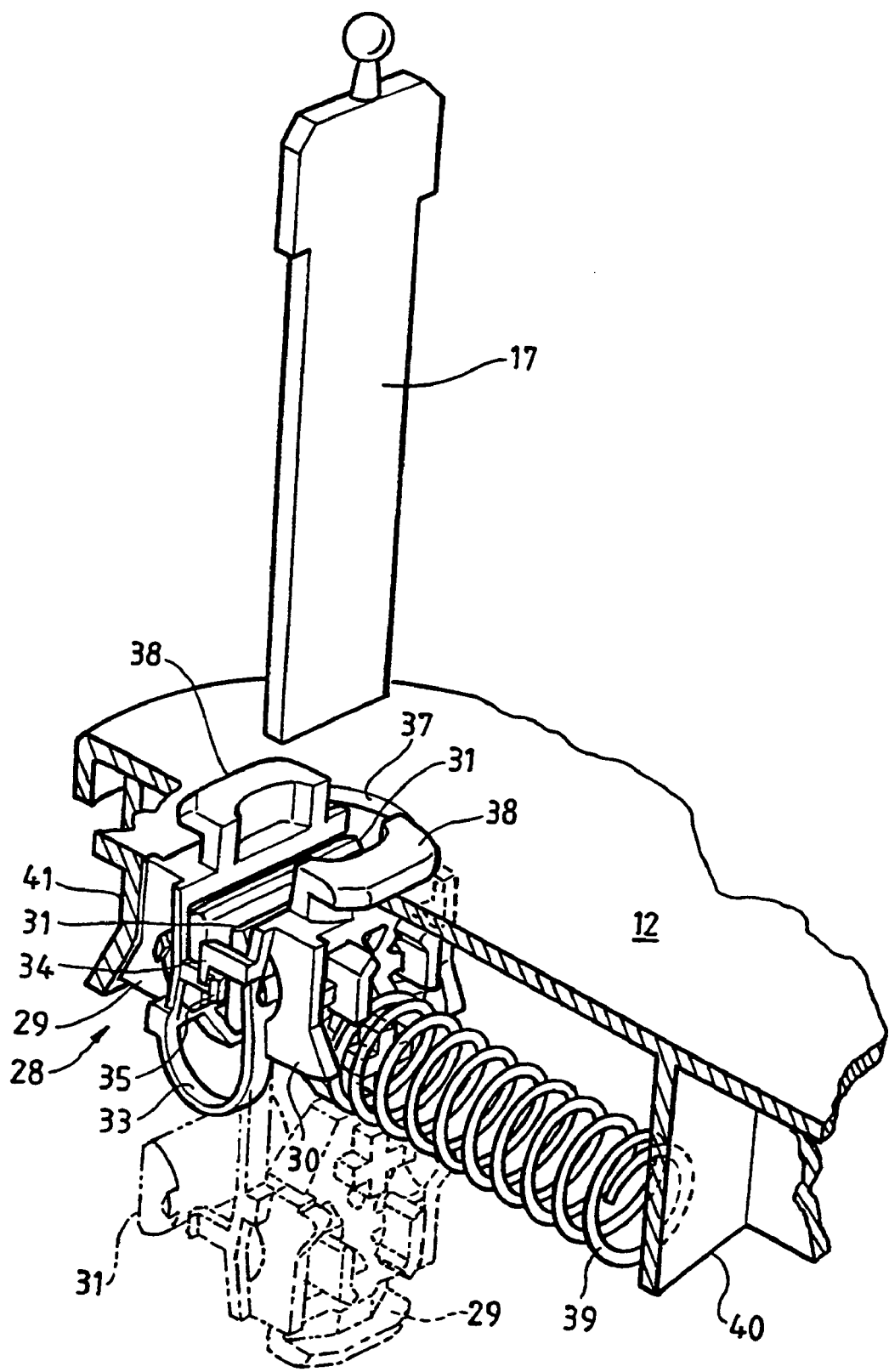
FIG. 4 shows a perspective view of a second embodiment of the invention.

The compression spring 25 provides a convenient means for adjusting the gripping force applied to the blades 17. The compression spring can be matched to provide the required gripping force which will prevent unwanted movement while at the same time still enabling manual movement of the mirror support 11. FIG. 4 shows a second embodiment of the invention. In this embodiment, a single blade 17 and corresponding aperture is used.

In this embodiment, the aperture is formed by a frame member 28 that has two opposing halves 29 and 30. Held between the opposing halves 29 and 30 are semi-cylindrical gripping pads 31. The blade 17 is inserted between the gripping pads 31.

The opposing halves 29 and 30 of the frame member 28 are connected by a pair of bands 33. The left side opposing half 29 is shown in dashed outline in FIG. 4. This opposing half 29 is rotated towards the other opposing half 30 and are clipped together. In this embodiment, clip 34 locates over projection 35 so that the opposing halves 29 and 30 of the frame member 28 are held together. A clip member 34 and projection 35 are provided on either side of the frame member 28. This enables the opposing halves 29 and 30 to be held together prior to attachment within the base portion 12.

Each of the opposing halves 29 and 30 are provided with an elongate semi-circular recess. The gripping pads 31 locate within these recesses. The gripping pads 31 are held in place once the opposing halves 29 and 30 of the frame member 28 are clipped together.

The base portion 12 has a circular aperture 37 within which the frame member 28 locates. Each of the opposing halves 29 and 30 are provided with a flange 38 that each locate through the aperture 37 and extend over the upper surface of the base portion 12. Location of the blade 17 between the gripping pads 31 holds the opposing halves 29 and 30 apart and therefore prevent the frame member 28 disengaging from the aperture 37.

A spring 39 is held in a compressed state between a wall 40 and the opposing half 30 of the frame member 28. The other opposing half 29 of the frame member 28 abuts against a wall 41. This ensures that a compressive force is applied to the blade 17. This provides the necessary resistance to movement of the blade 17. As with the first embodiment, the compression spring can be matched to provide the required gripping force which will prevent unwanted movement while at the same time enabling movement of the mirror support 11.

The invention provides an assembly that is component and easy to manufacture while not requiring close tolerances to ensure proper function of the mounting assembly 10.

What is claimed is:

1. A mirror mounting assembly for preventing unwanted movement of said mirror comprising:
   a mirror support for holding a mirror,
   a base portion,
   a pivoting joint between said mirror support and said base portion that allows said mirror support to pivot with respect to said base portion,
   a link extending between said mirror support and said base, a first end of said link held with respect to either said mirror support or said base portion, and
   an aperture having a pair of walls with one of said walls being resiliently moveable, wherein said aperture is located in either said mirror support or said base into which the second end of said link locates, there being a tight sliding fit between said pair of walls of said aperture and said link which allows said link to move through said aperture so that said mirror support may be adjusted with respect to said base, but which acts to prevent unwanted movement of said mirror support during normal use.

2. A mirror mounting assembly according to claim 1 wherein said link is pivotally attached to said mirror support.

3. A mirror mounting assembly according to claim 2 where said first end of said link comprises a ball, said mirror support further comprising a socket within which said ball locates.

4. A mirror mounting assembly according to claim 1 wherein said link comprises a flat elongate member.

5. A mirror mounting assembly according to claim 4 wherein said link has a generally rectangular cross-section.

6. A mirror mounting assembly according to claim 1 further comprising a spring applying force to one of said walls.

7. A mirror mounting assembly according to claim 1 wherein said aperture comprises a pair of walls where one of said walls is movable and further comprising a force member so that said wall is resiliently movable.

8. A mirror mounting assembly according to claim 7 wherein said force member comprises a spring.

9. A mirror mounting assembly according to claim 7 wherein said link comprises a flat elongate member.

10. A mirror mounting assembly according to claim 1 wherein said aperture comprises a pair of movable walls and further comprising a force member to allow resilient movement of said walls.

11. A mirror mounting assembly according to claim 10 wherein said walls are held together by a frame where said frame is attachable to said base portion.

12. A mirror mounting assembly according to claim 11 wherein said force member comprises a spring.

13. A mirror mounting assembly according to claim 12 wherein said link has a generally rectangular shape.

14. A mirror mounting assembly for preventing unwanted movement of said mirror comprising:
   a mirror support for holding a mirror,
   a base portion,
   a pivoting joint between said mirror support and said base portion that allows said mirror support to pivot with respect to said base portion,
   a pair of links extending between said mirror support and or said bases,
   a pair of apertures each having a pair of walls with one of said walls being resiliently moveable wherein said pair of apertures are located in either said mirror support or said base into which second ends of said links locate, there being a tight sliding fit between said pair of walls of each said apertures and said links which allows said links to move through said apertures so that said mirror support may be adjusted with respect to said base, but which act to prevent unwanted movement of said mirror support during normal use.

15. A mirror mounting assembly according to claim 14 wherein each said resiliently moveable wall has a force member applied to each said movable wall so that they are resiliently movable.

16. A mirror mounting means according to claim 15 wherein each said pair of walls is held together by a frame where said frame is attachable to said base portion.

17. A mirror mounting assembly for preventing unwanted movement of said mirror comprising:
   a mirror support for holding a mirror,
   a base portion,
   a pivot joint between said mirror support and said base portion that allows said mirror support to pivot with respect to said base portion,
   a pair of links extending between said mirror support and said base,
   a pair of apertures each having a pair of walls with one of said walls being resiliently moveable wherein said pair of apertures are located in either said mirror support or said base into which second ends of said links locate, there being a tight sliding fit between said pair of walls of each of said apertures and said links which allows said links to move through said apertures so that said mirror support may be adjusted with respect to said base, but which act to prevent unwanted movement of said mirror support during normal use, and
   a force member having a spring placed between said moveable walls to allow said moveable walls to move resiliently.

18. A mirror mounting means according to claim 17 wherein said movable walls are hinged to said base portion.

19. A mirror mounted assembly for preventing unwanted movement of said mirror comprising:
   a mirror support for holding a mirror,
   a base portion,
   a pivot joint between said mirror support and said base portion that allows said mirror support to pivot with respect to said base portion,
   a pair of links extending between said mirror support and said base, wherein said links comprise flat elongate members with a generally rectangular cross-section and
   a pair of apertures each having a pair of walls with one of said walls being resiliently moveable wherein said pair of apertures are located in either said mirror support or said base into which second ends of said links locate, there being a tight sliding fit between said pair of walls of each said apertures and said links which allows said links to move through said aperture so that said mirror support may be adjusted with respect to said base, but which act to prevent unwanted movement of said mirror support during normal use.

* * * * *

UNITED STATES PATENT AND TRADEMARK OFFICE
CERTIFICATE OF CORRECTION

PATENT NO. : 6,939,016 B1
DATED : September 6, 2005
INVENTOR(S) : Munyard et al.

It is certified that error appears in the above-identified patent and that said Letters Patent is hereby corrected as shown below:

Title page,
Item [75], Inventors, "Fineri" should be -- Fimeri --.

Column 5,
Line 62, "and or said bases" should be -- and said base --.

Signed and Sealed this

Twenty-first Day of March, 2006

JON W. DUDAS
*Director of the United States Patent and Trademark Office*